United States Patent
Imoto et al.

(10) Patent No.: US 11,462,804 B2
(45) Date of Patent: *Oct. 4, 2022

(54) SYSTEMS AND METHODS TO CONTROL LITHIUM PLATING

(71) Applicant: TeraWatt Technology Inc., Santa Clara, CA (US)

(72) Inventors: Hiroshi Imoto, Kakogawa (JP); Ken Ogata, Kakogawa (JP); Juichi Arai, Kakogawa (JP); Yang Yang, Kakogawa (JP)

(73) Assignee: TeraWatt Technology Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,032

(22) Filed: Jan. 8, 2019

(65) Prior Publication Data
US 2020/0220141 A1   Jul. 9, 2020

(51) Int. Cl.
*H01M 50/449*   (2021.01)
*H01M 10/0525*   (2010.01)
*H01M 4/133*   (2010.01)
*H01M 4/1393*   (2010.01)
(Continued)

(52) U.S. Cl.
CPC .......... *H01M 50/449* (2021.01); *H01M 4/133* (2013.01); *H01M 4/1393* (2013.01); *H01M 10/0525* (2013.01); *H01M 50/403* (2021.01); *H01M 50/411* (2021.01)

(58) Field of Classification Search
CPC ....................................................... H01M 50/04
See application file for complete search history.

(56) References Cited

U.S. PATENT DOCUMENTS

| 5,691,005 A | 11/1997 | Morigaki et al. |
| 6,468,698 B1 * | 10/2002 | Hamano ................. H01M 2/16 |
| | | 429/316 |
| 2010/0035128 A1 | 2/2010 | Scordilis-Kelley et al. |

(Continued)

FOREIGN PATENT DOCUMENTS

| JP | 2003-203677 A | 7/2003 |
| JP | 2018-137099 A | 8/2018 |
| JP | 2018-195576 A | 12/2018 |

OTHER PUBLICATIONS

International Search Report and Written Opinion dated Apr. 29, 2020 in related application No. PCT/US2020/012657, all pgs.

*Primary Examiner* — Haroon S. Sheikh
(74) *Attorney, Agent, or Firm* — Kilpatrick Townsend & Stockton LLP

(57) ABSTRACT

Various battery cell arrangements are presented herein. The battery cell can include an anode current collector. The battery cell can include a carbon-based anode coating layer that coats the anode current collector. A first bond between the anode current collector and the anode coating layer may have a first adhesion strength. The battery cell also includes a cathode, a separator layer that contacts the cathode, and a separator coating layer. The separator coating layer can be positioned between the anode coating layer and the separator layer. A second bond between the separator coating material and the anode coating material has a second adhesion strength. The second adhesion strength of the second bond may be greater than the first adhesion strength of the first bond.

20 Claims, 5 Drawing Sheets

(51) Int. Cl.
*H01M 50/403* (2021.01)
*H01M 50/411* (2021.01)

(56) References Cited

U.S. PATENT DOCUMENTS

| | | | |
|---|---|---|---|
| 2014/0272531 A1* | 9/2014 | Manning | H01M 50/44 |
| | | | 429/144 |
| 2015/0024249 A1 | 1/2015 | Lim et al. | |
| 2017/0133660 A1 | 5/2017 | Kurihara et al. | |
| 2020/0127266 A1* | 4/2020 | Kwack | H01M 2/1653 |
| 2020/0203757 A1* | 6/2020 | Park | H01M 4/0445 |
| 2020/0287192 A1* | 9/2020 | Shin | H01M 2/1653 |

* cited by examiner

SYSTEMS AND METHODS TO CONTROL LITHIUM PLATING

CROSS REFERENCE TO RELATED APPLICATION

This application is related to U.S. patent application Ser. No. 16/243,041, entitled "Systems and Methods to Control Lithium Plating", filed on Jan. 8, 2019, the entire disclosure of which is hereby incorporated by reference for all purposes.

BACKGROUND

Conventional batteries, including lithium ion batteries, may not provide sufficient energy for various mobile applications, such as for powering a vehicle. For such applications, a larger volumetric energy density and gravimetric energy density of the battery are required, such as to provide the vehicle with sufficient power and range.

A battery's energy is a multiple of the capacity and the average operating voltage. Various attempts have been made to increase the capacity of batteries. Silicon-based materials have been investigated for use as a high capacity anode. However, swelling and shrinking of the silicon-based material during charge and discharge can result in poor cyclability; thus, limited amounts of silicon-based material can be added to a conventional graphite anode and the capacity increase was limited.

Another invested option for increasing the capacity of batteries was to plate lithium on an anode as lithium metal. However, there is no host material in an anode like graphite or silicon. Such lithium plating can result in a high anode capacity; however, the cyclability of a battery cell that includes such an anode may be poor. This plating, depending on the location within the battery cell, can degrade the performance of the battery cell. For example, lithium plating can result in lithium being electrically disconnected from other components of the battery cell and the anode capacity of the battery cell decreasing. As a greater number of charge and discharge cycles of the battery cell are performed, the plating may increase and the performance of the battery cell may continue to degrade due to lithium plating.

SUMMARY

Various embodiments are described related to a battery cell. In some embodiments, a battery cell is described. The device may include an anode current collector. The device may include a carbon-based anode coating layer that may coat the anode current collector. A first bond between the anode current collector and the anode coating layer may have a first adhesion strength. The device may include a cathode. The device may include a separator layer that may contact the cathode. The device may include a separator coating layer. The separator coating layer may be positioned between the anode coating layer and the separator layer. A second bond between the separator coating layer and the anode coating layer may have a second adhesion strength. The second adhesion strength of the second bond may be greater than the first adhesion strength of the first bond.

Embodiments of such a method may include one or more of the following features: a peel test may be used to determine that the second adhesion strength of the second bond may be greater than the first adhesion strength of the first bond. The peel test may be a 180 degree peel test. The separator coating layer may include polyvinylidene fluoride (PVDF). Heat and pressure may be applied to the battery cell to increase adhesion between the separator coating layer and the anode coating layer. The device may further include an electrolyte solution that permeates the cathode, the separator layer, and the separator coating layer. The device may further include lithium plating located between the anode current collector and the anode coating layer. No lithium plating may be present between the anode coating layer and the separator coating layer.

In some embodiments, a method of creating a battery cell is described. The method may include coating an anode current collector with an anode coating layer. The method may include coating a separator with a separator coating layer. The method may include pressing the anode current collector toward the separator such that the anode coating layer may be pressed against the separator coating layer. The method may include applying heat while the anode current collector may be pressed against the separator such that the anode coating layer may be pressed against the separator coating layer. A first bond between the anode current collector and the anode coating layer may have a first adhesion strength. A second bond between the separator coating layer and the anode coating layer having a second adhesion strength may be present. The second adhesion strength of the second bond may be greater than the first adhesion strength of the first bond.

Embodiments of such a method may include one or more of the following features: performing a peel test to determine that the second adhesion strength of the second bond may be greater than the first adhesion strength of the first bond. The peel test may be a 180 degree peel test. The separator may include polyvinylidene fluoride (PVDF). The method may further include adding an electrolyte solution that may permeate a cathode of the battery cell, the separator, and the separator coating layer. Lithium plating may be located between the anode current collector and the anode coating layer. No lithium plating may be present between the anode coating layer and the separator coating layer. Coating the anode current collector may include coating the anode current collector with a slurry of carbon black, SBR (styrene-butadiene rubber), CMC (carboxymethyl cellulose) and water. Coating the separator with the separator coating layer may include coating the separator with a PVdF slurry that comprises NMP (N-methylpyrrolidone). Pressing the anode current collector toward the separator may include applying a pressure between 50 and 200 $N/cm^2$.

DETAILED DESCRIPTION OF THE INVENTION

The location of lithium plating may be controlled by having an anode coating layer that adheres to a coated separator more than the anode coating layer adheres to an anode current collector. Lithium plating may tend to occur on the anode between layers have a relatively weak bond. By having the adhesion be greater between the coated separator and the anode coating layer as compared to between the anode coating layer and the anode current collector, lithium may be encouraged to plate between the anode coating layer and the anode current collector.

When lithium plating occurs between a coating on the anode current collector and a separator that is located between the anode and the cathode, the lithium plating can become electrically disconnected from the anode, rendering it inactive, thus reducing the ion storage capacity of the anode, and reducing the cyclability of the battery cell. In contrast, if the lithium plating occurs between the anode current collector (which is functioning as the anode) and the anode coating layer, the plated lithium remains electrically connected with the anode current collector. This arrangement results in a higher ion storage capacity of the anode being maintained and the cyclability of the battery cell degrading less.

Figure 1:
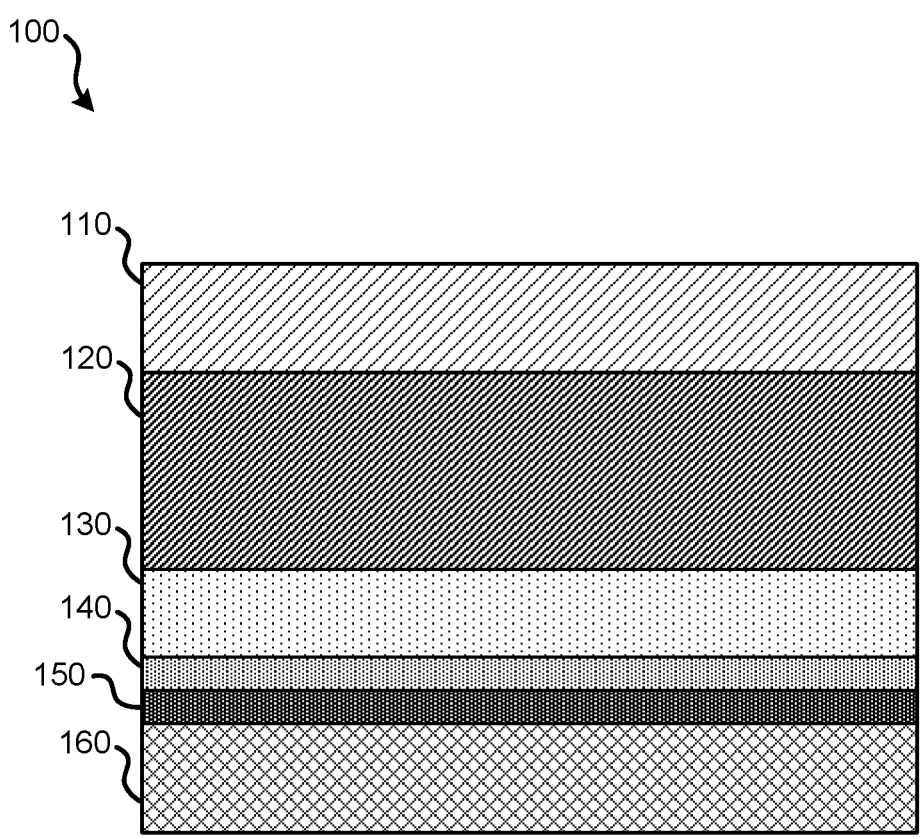
FIG. 1 illustrates an embodiment of the layers of a battery cell having an anode coating layer.

FIG. 1 illustrates an embodiment of the layers 100 of a battery cell having an anode coating layer. Layers 100 can include: cathode current collector 110; cathode 120; separator layer 130; separator coating layer 140; anode coating layer 150; and anode current collector 160.

Cathode current collector 110 may be metallic and conductive. Cathode current collector may be formed from aluminum or some other conductive metal. Aluminum may be used for cathode current collector 110 since it does not react with lithium at a high potential. Anode current collector may also be metallic and conductive. Anode current collector 160 may be made from copper, such as copper foil. Other conductive metals may also possible. Copper may be preferable material for anode current collector 160 due to its low amount of reactivity with lithium at a low potential.

In layers 100, no exclusive anode layer may be present. Rather, layers 100 illustrate an arrangement of an "anode free" battery cell. In such a battery cell, anode current collector 110 can function as both the anode current collector and the anode. In some embodiments, depending on the material used to make anode coating layer 150 (e.g., graphite), the anode ion storage capacity may be increased; therefore, anode coating layer 150 and anode current collector 160 may collectively function as the anode.

Cathode 120 may be coated onto cathode current collector 110 (e.g., prior to layers 100 being assembled together). Alternatively, cathode 120 may be layered with cathode current collector 110 using an arrangement other than coating. For instance, sheets of different materials may be pressed together. Cathode 120 may be made from NCM (lithium nickel cobalt manganese oxide, $LiNoCoMnO_2$), NCA (lithium nickel cobalt aluminum oxide, $LiNiCoAlO_2$) or some other suitable cathode material.

Separator layer 130 may be present between cathode 120 and anode coating layer 150 (which functions as the battery cell's anode). Separator layer 130 may be made from a nonreactive material that allows lithium ions to pass between cathode 120 and anode coating layer 150. Separator layer 130 may be a porous polyethylene (PE), polypropylene (PP), or some other form of permeable membrane that prevents short circuits while still allowing for the transport of ionic charge carriers (e.g., Lithium ions) between the anode and the cathode.

Separator layer 130 may having an attached coating, referred to as separator coating layer 140. Separator coating layer 140 may be coated onto separator layer 130 prior to layers 100 being assembled together. Separator coating layer 140 may only be present on one side of separator layer 130. Separator coating layer 140 may make contact with an anode coating layer 150 of the battery cell. Separator coating layer 140 may be made from a nonreactive material that allows lithium ions to pass between cathode 120 and anode coating layer 150 and can also strongly adhere to anode coating layer 150. Separator coating layer 140 may be a PVdF (polyvinylidene fluoride or, also referred to as, polyvinylidene difluoride) layer. PVdF is a highly non-reactive thermoplastic fluropolymer that can have high resistance to solvents, acids, and bases. PVdF can be in the form of a powder that can be coated onto other materials, such as onto separator layer 130. In other embodiments, different materials may be used for separator coating layer 140.

Anode coating layer 150 may be coated onto anode current collector 160. Anode coating layer 150 may be a coating of carbon, such as in the form of graphite and/or carbon black. Anode coating layer 150 may initially be coated onto anode current collector 160 prior to layers 100 being assembled together. In some embodiments anode coating layer 150 may not be coated onto anode current collector 160, but rather may be a separate sheet of material that is layered onto anode current collector 160. Anode coating layer 150 may be applied in the form of a slurry to anode current collector 160.

In other embodiments, anode coating layer 150 may be a layer of lithium ion conductive solid state electrolyte or gel electrolyte. Therefore, in such embodiments, rather than a carbon coating of the anode current collector 160 being present, a solid state electrolyte layer or a gel electrolyte layer may be present as anode coating layer 150. A gel polymer electrolyte such as PVdF, polyacrylonitrile (PAN), or polymethyl methacrylate (PMMA) may be used. Such electrolytes may be gelled by an organic solvent and contain a lithium salt, such as ($LIPF6$, $LiFSI$, $LIBOB$, $LiBF4$, $LiClO4$, etc.). A polymer solid state electrolyte may be used, such as polyethylene oxide (PEO), which can contain a lithium salt, such as ($LiPF6$, $LiTFSI$, $LiFSI$, $LIBOB$, $LiBF4$, $LiClO4$). An inorganic solid state electrolyte such as an oxide LATP ($Li1.3Al0.3Ti1.7(PO4)3$), LAGP ($Li1.3Al0.3Ge1.7(PO4)3$), $LIPON(Li2.9PO3.3N0.4)$, $LLZO(Li7Lab3Zr2O12)$, a sulfide ($LGPS(Li10GeP2S12)$, $Li2S$—$P2S5$), complex hydrides, $Li3N$, etc. may be used. If the lithium ion conductive material is in the form of a particle, it can be mixed with a binder material to be used to coat anode current collector 160.

In some embodiments, layers 100 may be immersed in a liquid electrolyte solution, such as lithium hexafluorophosphate ($LiPF6$). The electrolyte solution may act as a conductive pathway for the movement of cations passing from the anode to the cathode during a discharging cycle of the battery cell and may act as a conductive pathway for the movement of cations passing from the cathode to the anode during a charging cycle of the battery cell. In some embodiments, layers 100, after being layers together, may be rolled to make a cylindrical "jelly-roll" style battery cell. Other forms of battery cells are also possible, such as planar battery cells.

Figure 2:
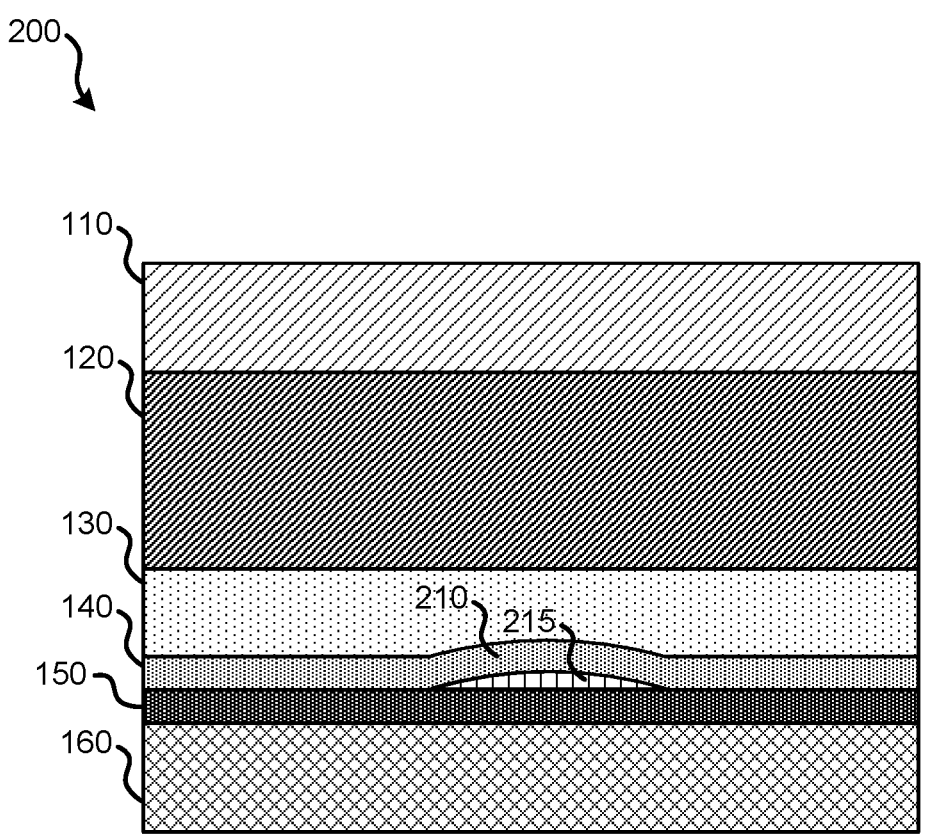
FIG. 2 illustrates an embodiment of the layers of a battery cell in which lithium plating has occurred between the anode coating layer an a separator coating layer.

FIG. 2 illustrates an embodiment of layers 200 of a battery cell in which lithium plating has occurred between the anode coating layer and a separator coating layer. In FIG. 2, lithium 215 may plate between anode coating layer 150 and separator coating layer 140. Such plating of lithium 215 can result in the lithium becoming permanently electrically disconnected and, thus, can decrease the energy density of the battery cell. Such plating can occur when the adhesion of the bond between anode coating layer 150 and anode current collector 160 is greater than the adhesion of the bond between separator coating layer 140 and anode coating layer 150.

Figure 3:
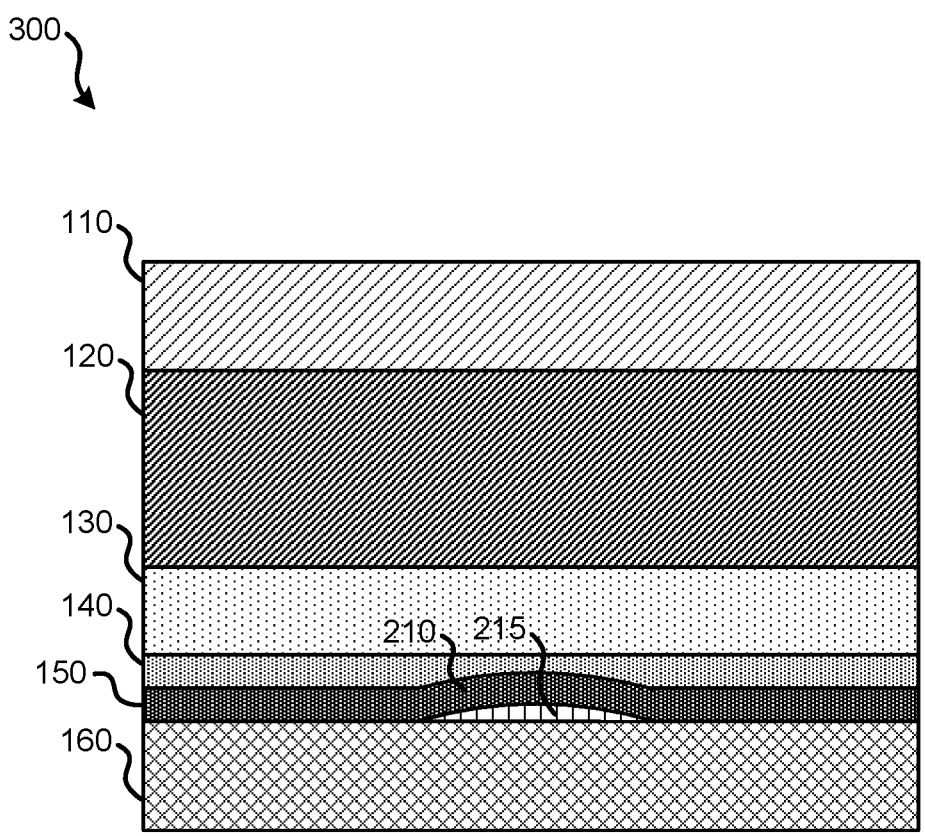
FIG. 3 illustrates an embodiment of the layers of a battery cell in which lithium plating has occurred between the anode current collector and the anode coating layer.

FIG. 3 illustrates an embodiment of the layers 300 of a battery cell in which lithium plating has occurred between the anode current collector and the anode coating layer. In FIG. 3, lithium 215 may plate between anode coating layer 150 and anode current collector 160. Such plating of lithium 215 allows the lithium to remain electrically connected with the anode and, thus, does not decrease the energy density of the battery cell as much as the lithium plating of the embodiment of FIG. 2. Such plating can occur when the adhesion of the bond between anode coating layer 150 and anode current collector 160 is less than the adhesion of the bond between separator coating layer 140 and anode coating layer 150.

Figure 4:
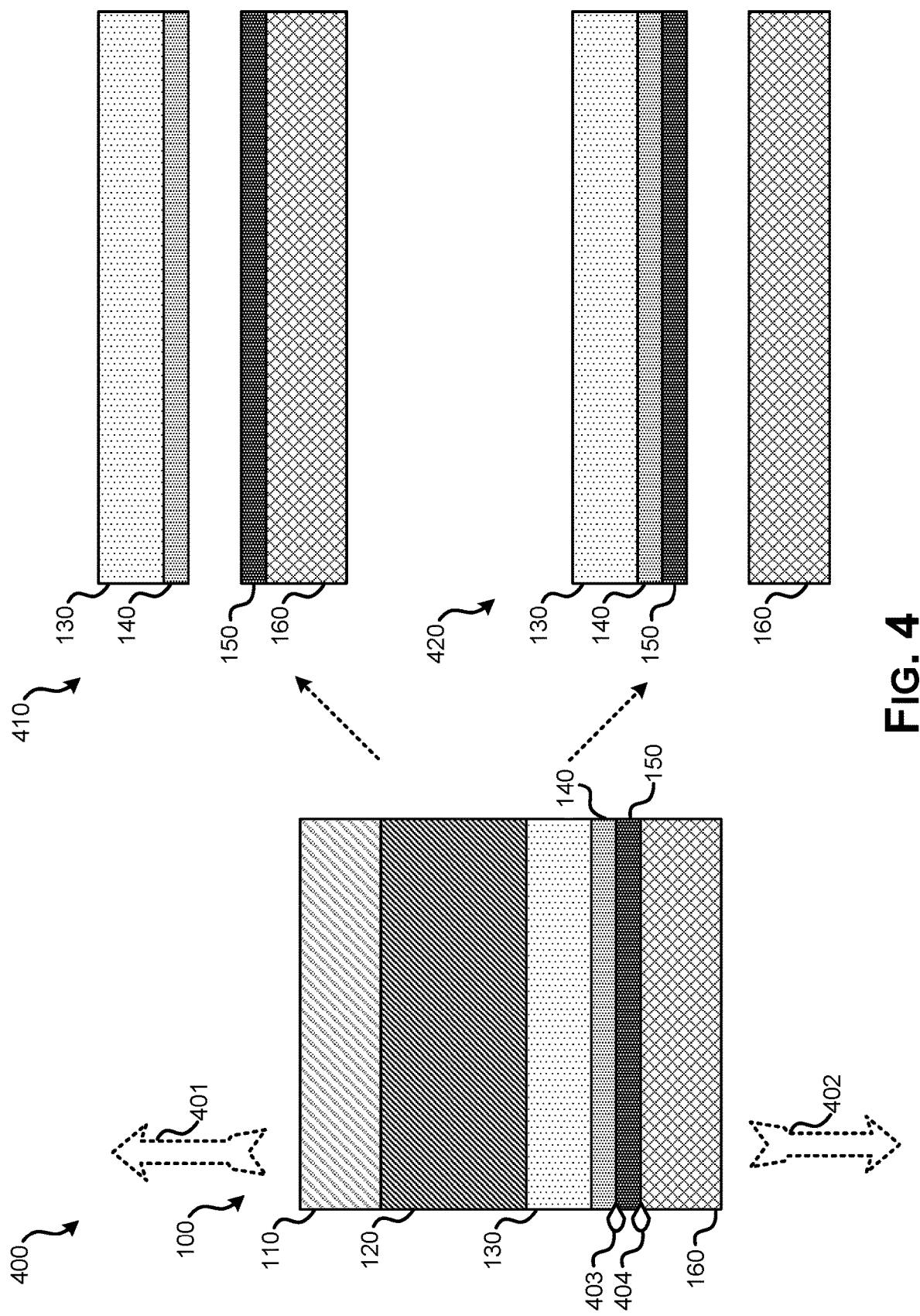
FIG. 4 illustrates an embodiment of a peel test in which a manufactured battery cell is subjected to a peel test to determine where lithium plating is expected to occur.

In order to determine whether the bond strength between the anode coating layer 150 and anode current collector 160 is greater or less than the bond strength between the anode coating layer 150 and separator coating layer 140, a peel test may be performed. FIG. 4 illustrates an embodiment of a peel test 400 in which a manufactured battery cell is subjected to a peel test to determine where lithium plating is expected to occur. The peel test may be performed according to standard JIS K 6854-2 (as established at the time of filing). The peel test may be a "180 degree-peel" test, in which a sample of layers 100 are pulled in different directions.

The peel test may be performed in multiple ways to determine if the bond strength between the anode coating layer 150 and anode current collector 160 is greater or less than the bond strength between the anode coating layer 150 and separator coating layer 140. One possibility is that for a sample of layers 100, force 401 is applied to one of the top four layers (cathode current collector 110, cathode 120, separator layer 130, or separator coating layer 140)) and force 402 is applied to anode current collector 160. If, following forces 401 and 402 being applied, embodiment 410 results, it has been determined that the bond between the separator coating layer 140 and anode coating layer 150 has less adhesion than the bond between anode current collector 160 and anode coating layer 150. If, following forces 401 and 402 being applied, embodiment 420 results, it has been determined that the bond between the separator coating layer 140 and anode coating layer 150 has greater adhesion than the bond between anode current collector 160 and anode coating layer 150. Embodiment 420 resulting is preferable since less adhesion between anode coating layer 150 and anode currently collector 160 can result in lithium plating between anode current collector 160 and anode coating layer 150.

Another way of performing the peel test may be to introduce initial separation between separator coating layer 140 and anode coating layer 150 at location 403. The smallest amount of forces 401 and 402 (which are opposite and equal) necessary to separate separator coating layer 140 and anode coating layer 150 may then been measured. The process may then be repeated by initial separation being introduced at location 404, forces 401 and 402 may then be applied to measure the smallest amount of force necessary to separate anode current collector 160 from anode coating layer 150. If the force needed to separate the layers at location 403 is greater, lithium can be expected to plate between anode current collector 160 and anode coating layer 150. If the force needed to separate the layers at location 404 is greater, lithium can be expected to plate between separator coating layer 140 and anode coating layer 150.

Other forms of peel tests may be performed in order to determine whether greater adhesion between separator coating layer 140 and anode coating layer 150 or anode current collector 160 and anode coating layer 150 is present.

Figure 5:
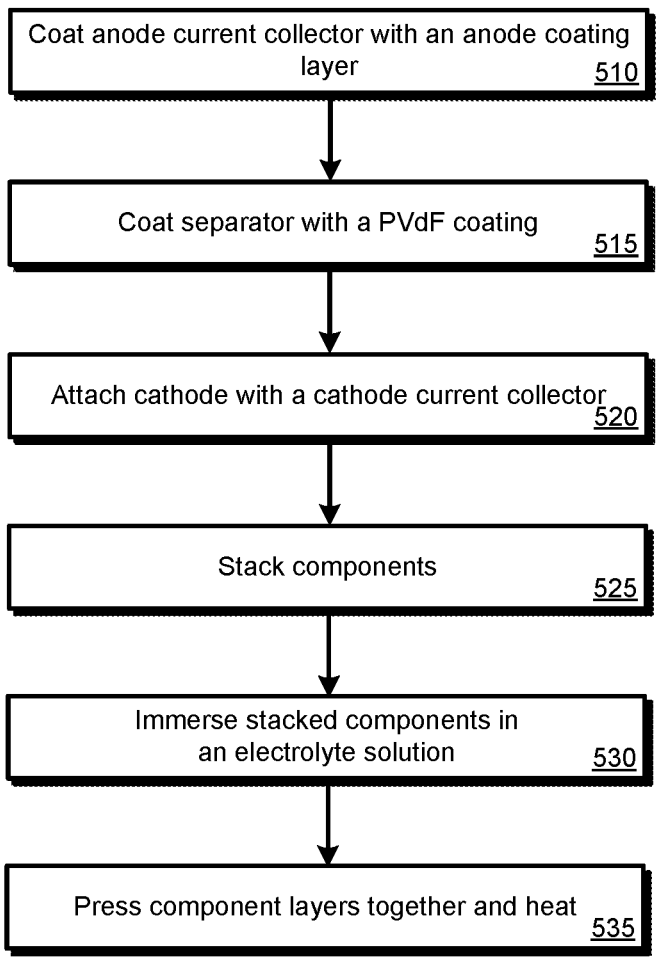
FIG. 5 illustrates an embodiment of a method for manufacturing a battery that resists lithium plating that electrically disconnects from the anode.

FIG. 5 illustrates an embodiment of a method 500 for manufacturing a battery that resists lithium plating that electrically disconnects the anode. Method 500 may be used to obtain a layering of the components of a battery cell in which the adhesion between a separator coating layer and an anode coating layers is greater than the adhesion between the anode current collector and the anode coating layer, thus encouraging lithium plating to occur between the anode current collector and the anode coating layer. Such an arrangement can result in the lithium remaining electrically connected with the anode.

At block 510, an anode current collector may be coated with an anode coating layer. The anode coating layer may help prevent direct contact of the anode current collector with the separator. The anode current collector may function as the anode. For example, a carbon-coated copper film may be used. The anode coating layer may be deposited as a spray or powder onto the anode current collector. In some embodiments, the anode coating layer is carbon powder combined with a form of binder, such as a polymer binder, that causes the carbon powder to adhere to the anode current collector. In some embodiments, a metal alloy may be used as the anode coating layer and may be deposited by sputtering or chemical vapor deposition (CVD). In still other embodiments, the anode coating layer may be a non-porous polymer layer, such as PVdF. In other embodiments, a lithium-ion conductive solid state electrolyte or gel electrolyte may be used as the anode coating layer. For example, an inorganic solid state electrolyte (LATP) or polymer solid state electrolyte (e.g., PEO containing the lithium salt of LiPF6) may be used as the anode coating layer.

At block 515, the separator may be coated. The separator (with may be PE) may be coated with PVdF. The cathode may be attached with a cathode current collector, such as by sputtering, CVD, or by two layers of materials be layers onto each other at block 520. The cathode may be NCM333 (LiNiCoMnO), carbon black, CMC, and SBR (in a ratio of 95.5%, 0.5%, 2% and 2%, respectively). At block 525, the anode current collector, the anode coating layer, the separator, the separator coating layer, the cathode, and the cathode current collector may be stacked together, such as illustrated in FIG. 1.

Once the components have been stacked together, the layers may be immersed in an electrolyte solution at block 530. The electrolyte may be injected such that it permeates the cathode, separator, separator coating layer, and anode coating layer. The electrolyte may aid in movement of the lithium ions during charge and discharge cycles of the battery cell. The electrolyte may be 1.3M LiPF6.

At block 535, pressure and heat may be applied to the stacked layers. The electrolyte may have already been injected at block 530. The pressure and heat applied at block 535 may cause the adhesion between the anode coating layer and the separator coating to increase such that the adhesion between the anode coating layer and the separator coating layer is greater than the adhesion between the anode coating layer and the anode current collector. In some embodiments, the layers are pressed at a temperature of around 95° C. In other embodiments, the temperature used is between 75° C.-100° C. The layers can be pressed at around 100 N/cm2- electrode for around 4 minutes. The press pressure used can be between 50~200 N/cm2-electrode and the pressing time can be between 2~6 minutes.

In a tested embodiment, a cathode slurry was made with cathode active material $Li_{1.05}Ni_{0.80}Co_{0.11}Mn_{0.09}O_2$, carbon black, VGCFs (vapor grown carbon fibers), and PVdF (polyvinylidene difluoride) in a weight ratio of 97:1:0.5:1.5 wt ratio with NMP (N-methylpyrrolidone). The slurry was then stirred by a homogenizer. The slurry was coated on aluminum foil, dried in a temperature oven and pressed. The pressed electrode was cut 60 mm×60 mm to make a cathode electrode.

In this tested embodiment, the carbon slurry for the anode coating layer was made with carbon black, SBR (styrene-butadiene rubber), CMC (carboxymethyl cellulose) and water. The carbon slurry was then stirred by a homogenizer. The slurry was coated on copper foil and dried in a temperature oven. The copper foil with the anode coating layer was cut 65 mm×65 mm to make the anode electrode.

In the tested embodiment, a PVdF slurry for the separator coating was made with PVdF and NMP. The PVdF slurry was stirred by a homogenizer. The PVdF slurry was then coated on a battery grade polyethylene separator (having a thickness of 12 μm) and the NMP was removed. The separator having a separator coating layer was thus obtained. This coated separator was cut 70 mm×70 mm.

In the tested embodiment, the coated separator was sandwiched by the cathode electrode and the anode electrode such that the separator coating layer was facing to the anode electrode as illustrated in layers 100 of FIG. 1. The stacked layers were placed into an aluminum laminate bag and the liquid electrolyte EC/MEC/DEC 15:20:65 vol. %, 1 wt. % VC, 1.3 mo1/L LiPF6 was injected. The laminate bag was then sealed, leaving cathode and anode terminal tabs exposed. After leaving the cell for more than 10 hours, the cell was heat-pressed at 95° C. and 100 N/cm2-electrode for 4 minutes.

Next, for the tested embodiment, the battery cell was charge and discharge cycled. The cell was charged 0.1 C 4.2V CC-CV until the current decayed to 0.05 C and discharged 0.1 C CC until a cut-off voltage of 3V. The discharge capacity at $1^{st}$ cycle and $5^{th}$ cycle was recorded, and the capacity retention was calculated by (discharge capacity at $5^{th}$ cycle)/(discharge capacity at $1^{st}$ cycle).

Following block 535, one or more peel tests as detailed in relation to FIG. 4 may be performed to determine where lithium plating can be expected to occur. The discharge capacity of a battery cell assembled according to method 500 and heat-pressed as discussed above has been shown to have a capacity retention of 60% (discharge capacity at fifth cycle divided by discharge capacity at first cycle). Such heating results in a peel type matching embodiment 420. However, if less heat is applied (e.g., approximately 55° C. instead of 90-105° C.) at heat-pressing, the peel type may match embodiment 410 and the capacity retention may drop significantly to around 35%. Failure to use any heat process further reduces the capacity retention to around 20%.

In the tested embodiment, commercially available PEO was dissolved in anhydrous acetonitrile and LiPF6 (Li/O=1/30) was added to the solution. The solution was then stirred and coated on copper foil. The acetonitrile solvent was evaporated slowly at room temperature in an argon gas glove box. Instead of copper foil with a carbon coating layer, this copper foil with PEO-LiPF6 was used and evaluated the capacity retention.

In other embodiments, where the anode coating layer is PEO containing the lithium salt of LiPF6 and heat is applied at 96° C. at heat-pressing, the capacity retention may be 56% and result in a peel type as illustrated in embodiment 420. In such embodiments, the slurry can be made with commercially available LATP, PVdF and NMP. The slurry can then stirred by a homogenizer and coated on to copper foil, then dried in a temperature oven. In this embodiment, copper foil with LATP was used and evaluated the capacity retention. Where the anode coating layer is LATP, and heat is applied at 90-105° C. at heat-pressing, the capacity retention is 51% and result in a peel type as illustrated in embodiment 420.

The methods and systems discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A battery cell, comprising:
an anode current collector comprising copper foil;
an anode coating layer that coats the anode current collector, wherein:
the anode coating layer comprises a lithium-ion conductive electrolyte;
a first bond between the anode current collector and the anode coating layer has a first adhesion strength; and
lithium metal plating occurs directly on a side of the copper foil of the anode current collector facing the anode coating layer during charging;
a cathode;
a separator layer that contacts the cathode;
a separator coating layer, distinct from the separator layer, wherein the separator coating layer is positioned between the anode coating layer and the separator layer, wherein:

a second bond between the separator coating layer and the anode coating layer has a second adhesion strength; and the second adhesion strength of the second bond is greater than the first adhesion strength of the first bond.

2. The battery cell of claim 1, wherein the separator coating layer comprises polyvinylidene fluoride (PVDF).

3. The battery cell of claim 1, further comprising an electrolyte solution that permeates the cathode, the separator layer, and the separator coating layer.

4. The battery cell of claim 1, wherein no lithium plating is present between the anode coating layer and the separator coating layer.

5. The battery cell of claim 1, further comprising: a liquid electrolyte that is soaked into the cathode, anode coating layer, separator layer, and separator coating layer of the battery cell.

6. The battery cell of claim 1, wherein the lithium-ion conductive electrolyte comprises one or more of a lithium ion conductive solid state electrolyte or a gel electrolyte.

7. The battery cell of claim 6, wherein the lithium-ion conductive electrolyte comprises the gel electrolyte and the gel electrolyte comprises one or more of polyvinylidene flouride (PVdF), polyacrylonitrile (PAN), or polymethyl methacrylate (PMMA).

8. The battery cell of claim 6, wherein the lithium-ion conductive electrolyte comprises the lithium ion conductive solid state electrolyte and the lithium ion conductive solid state electrolyte comprises an inorganic solid state electrolyte.

9. A method of creating a battery cell, the method comprising:
coating an anode current collector with an anode coating layer, wherein the anode current collector comprises copper foil, and wherein the anode coating layer comprises a lithium-ion conductive electrolyte;
coating a separator with a separator coating layer;
pressing the anode current collector toward the separator such that the anode coating layer is pressed against the separator coating layer; and
applying heat while the anode current collector is being pressed against the separator such that the anode coating layer is pressed against the separator coating layer, wherein
a first bond between the anode current collector and the anode coating layer has a first adhesion strength;
a second bond between the separator coating layer and the anode coating layer having a second adhesion strength is present;
the second adhesion strength of the second bond is greater than the first adhesion strength of the first bond; and
during charging, lithium metal plating occurs directly on the copper foil of the anode current collector.

10. The method of creating the battery cell of claim 9, wherein the separator comprises polyvinylidene fluoride (PVDF).

11. The method of creating the battery cell of claim 9, the method further comprising: adding an electrolyte solution that permeates a cathode of the battery cell, the separator, and the separator coating layer.

12. The method of creating the battery cell of claim 9, wherein no lithium plating is present between the anode coating layer and the separator coating layer.

13. The method of creating the battery cell of claim 9, wherein the lithium-ion conductive electrolyte comprises one or more of a solid state electrolyte layer or a gel electrolyte.

14. The method of creating the battery cell of claim 13, wherein the lithium-ion conductive electrolyte comprises the gel electrolyte and the gel electrolyte comprises one or more of polyvinylidene flouride (PVdF), polyacrylonitrile (PAN), or polymethyl methacrylate (PMMA).

15. The method of creating the battery cell of claim 14, further comprising gelling the gel electrolyte by adding an organic solvent.

16. The method of creating the battery cell of claim 13, wherein the lithium-ion conductive electrolyte comprises a lithium ion conductive solid state electrolyte and the lithium ion conductive solid state electrolyte comprises an inorganic solid state electrolyte.

17. The method of creating the battery cell of claim 9, wherein coating the separator with the separator coating layer comprises coating the separator with a PVdF slurry that comprises NMP (N-methylpyrrolidone).

18. The method of creating the battery cell of claim 9, wherein pressing the anode current collector toward the separator comprises applying a pressure between 50 and 200 N/cm$^2$.

19. The method of creating the battery cell of claim 9, wherein the step of applying heat comprises applying heat at a temperature between 75 and 100 Celsius.

20. The method of creating the battery cell of claim 9, further comprising rolling the battery cell to form a "jelly-roll" style battery cell.

* * * * *